Jan. 10, 1939.   N. KASDAN ET AL   2,143,155
LIPSTICK HOLDER
Filed April 28, 1933
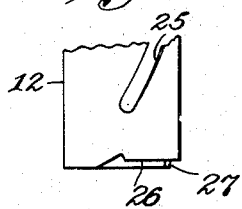
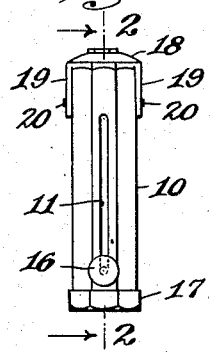
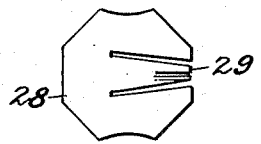
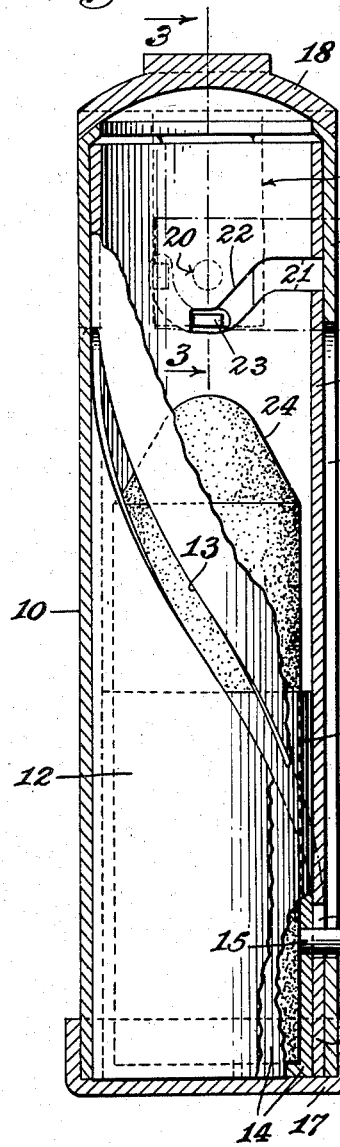
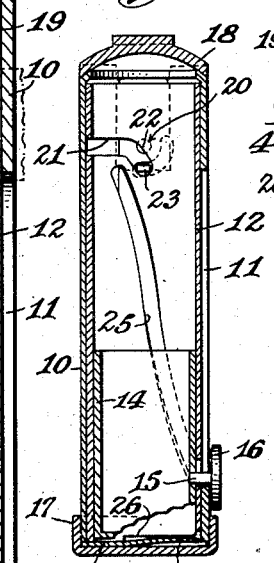
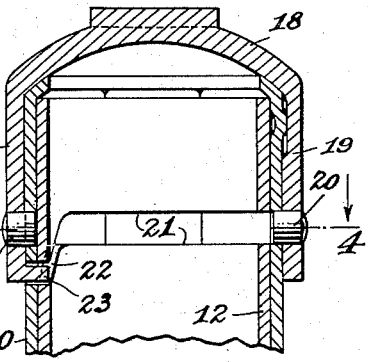
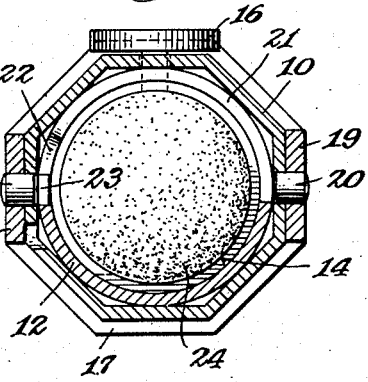
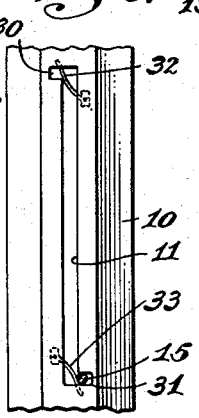
INVENTORS:
Nathan Kasdan and
Richard F. Landwehr
BY their ATTORNEY Patented Jan. 10, 1939

2,143,155

UNITED STATES PATENT OFFICE 2,143,155

LIPSTICK HOLDER

Nathan Kasdan, New York, and Richard F. Landwehr, Woodside, N. Y., assignors to Majestic Metal Specialties, Inc., New York, N. Y., a corporation of New York Application April 28, 1933, Serial No. 668,444

10 Claims. (Cl. 206—56)

This invention relates to lipstick holders and the like and has for its object the provision of a simple, compact and convenient device of this class which is adapted to be operated entirely by the hand in which it is held.

Devices for such one-hand operation have been heretofore suggested, but many of such have been bulky and of complicated and more expensive construction. The present invention is of simple construction comprising few parts.

Another feature of this invention is the interlocking mechanism between the cover and actuator which are separately movable.

Fig. 1 is a view showing one embodiment of this invention;

Fig. 2 is an enlarged section on the line 2—2 of Fig. 1;

Fig. 3 is a section on the line 3—3 of Fig. 2;

Fig. 4 is a section on the line 4—4 of Fig. 3;

Fig. 5 shows the preferred embodiment of this invention;

Fig. 6 is a detail showing the lower end portion of the helically slotted tube of Fig. 5;

Fig. 7 shows the yieldable or spring piece cooperating with the tube 12 and end cap 17;

Fig. 8 is an outside view of the device of Fig. 5.

The container 10, preferably of octagonal cross section as illustrated, is provided with a longitudinal slot 11. Within the container 10 is placed a cylindrical tube 12 open at both ends and having a helical slot 13 therein as shown in Fig. 2. Within the tube 13 is disposed the movable carrier 14 to which is secured the actuator pin 15 passing through the slots 13 and 11 to the outside of the container where a convenient actuator button 16 is attached to the pin. The lower end of the container 10 is closed by a removable cap 17 preferably yieldably retained in position by means of projections and recesses on opposite sides of the container and not herein shown. The top or open end of the container has a cover 18 provided with a pair of arms 19 which are secured to the pivot 20 lying in a median plane through the container. The open end of the container and the under side of the cover are rounded so that the cover may be conveniently swung into open and closed positions, the open position for the cover being shown by dotted lines in Fig. 2.

In the upper portion of the tube 12 there is provided a slot 21 having a horizontal portion and an inclined portion 22 shown in Fig. 2. A lug 23 projects inwardly from one of the cover arms 19 through an arcuate slot in the container, shown by the dotted lines in Figs. 2 and 5, and into the slot 21 of the tube 12. The lipstick material 24 is held in the carrier 14.

In Fig. 5 the general construction is quite similar to that in Figs. 1 and 2 except that the inclined or helical slot 25 in the tube 12 is arranged in the opposite direction to that of the slot 13 in Fig. 2. In this connection it may be borne in mind that the portion of Fig. 2 below the broken line shows the front portion of the tube 12 and slot 13 with the container removed, whereas, the slot 21 in tube 12 is in Fig. 2 shown as being on the rear portion of the tube 12 above the broken line. In Fig. 5 it will be seen that the slot 25 is shown on the rear side of the tube 12, looking at the slot from the inside of the tube and so is the slot 21 in Fig. 5.

In Figs. 2 and 5 the operation may be the same except for the fact that the tube 12 rotates in a different direction in one case from what it does in the other. The bottom of the tube 12 is shown in Fig. 6 as being cut away or recessed on one side as indicated by the numeral 26, the deepest portion of the recess being arranged to receive the spring finger 29 of the plate 28 positioned in the cap 17 as shown in Fig. 5. The wall 27 forming the rear of the recessed portion 26 may serve as a stop to limit possible rotation of the tube 12. In Fig. 8 the longitudinal slot 11 is shown as being provided with offset portions 30 and 31 at the top and bottom respectively of the slot. The actuator pin 15 may be moved into these offset portions and yieldably locked or retained in position by means of the springs 31 and 32, yet easily moved out from these offset portions into the main portion of the slot 11 whenever desired. The springs 31 and 32 are preferably mounted on the inside of the container in the space between the tube 12 and the container walls and, if necessary, portions of both the tube and container walls may be recessed to provide adequate clearance for these springs 31 and 32 which are of small depth. It will be understood that these springs are rigidly secured to the container wall, leaving the opposite end free to be bent aside as the actuator pin 15 is moved into or out of the offset portion.

As shown in Fig. 3 the inner portion of the right cover arm 19 is provided with a recess in which a small stamped-up projection formed on the container wall may engage to yieldably retain the cover in closed position. The container wall at the top has an inturned edge as illustrated, which prevents outward movement of the tube 12.

In both embodiments illustrated, the container is held in the fingers of one hand and the thumb applied to the actuator button 16 moving it upwardly in the slot 11. Such movement raises the carrier and also rotates the cover to an open position, the inclined portion 22 of the slot 21 co-operating with the lug 23 to raise it into the horizontal portion of the slot 21 and, in so doing, move the cover to the open position. As shown in Fig. 2, the cover arms are preferably of sufficient width to extend over the arcuate slot in the container wall so that such slot and the lug 23 is not readily seen from the outside. After the cover has been moved to the open position continued movement of the actuator button 16 ejects the lipstick material for use, after which it is withdrawn by moving the actuator button 16 downwardly and at the end of such movement the cover is closed by the actuator button.

When an offset portion 30 is provided at the upper end of the longitudinal slot 11 the carrier and lipstick may be locked in position so that during use it will not be necessary for the operator to retain a thumb or finger on the actuator button in order to prevent the carrier being moved down into the container by the pressure of the lipstick against the skin.

When the lower end of the slot 11 is provided with an offset portion 31 the actuator and carrier may be yieldably locked in this position against accidental movement and against the cover becoming accidentally opened. With such lower offset portion the helical slot in the tube 12 may or may not be provided with a correspondingly shaped lower offset portion. If the lower end of the helical tube is not provided with such offset portion, then if the angular extent of the offset portion 31 in the container wall is substantially equal to the angular extent of the inclined portion 22 of the slot 21, it will be understood that movement of the pin into the lower offset portion of the container wall rotates the tube 12 and may serve to close the cover. In this way, the movement of the cover may be completed before translation of the carrier begins, or, in other words, there may be no time overlap in the movements of the cover and carrier. If it is desired to have simultaneous movement of the cover and carrier, then the tube may be provided with suitable offsets so that the cover may not be raised after the actuator pin is moved in and out of the lower container offset 31. In this last event the offset portion to a slot in the tube 12 may be located either in the end of the inclined slot 25 or, if rotation of the tube 12 is not objectionable such offset may be instead arranged as an extension at the bottom of the inclined portion 22 of the slot 21. The tube 12 and its connections with the lug 23 and pin 15 will be understood to serve as an interlocking means between the cover and carrier, whereby the carrier will be prevented from moving upwardly far enough for the lipstick material to become smeared onto the underside of the cover.

If desired, the cover may be actuated separated by the thumb and then the thumb move the actuator button. For greater convenience in this last case the button 16 may be arranged to move in the opposite direction to movement of the carrier by providing a pair of oppositely inclined helical slots within the container, but such is not as simple and inexpensive a construction as the present since the tube 12 is easier to manufacture.

Among the advantages of this invention it may be mentioned that the longitudinal slot 11 is at all times closed against the ingress of any dirt to the lipstick material. Another advantage is the ability of the carrier to be maintained or locked in its upper position so that the operator need not hold the button during use of the lipstick. The helically slotted tube 12 in Fig. 5 is floated or spring pressed against the upper inturned flange on the open end of the container, by the spring finger 29 with the result that there is less feel of lost motion. The cover being mounted on the fixed pivot does move longitudinally of the container. The interlocking mechanism between the cover and carrier prevents the cover from becoming accidentally closed while the lipstick is open and also prevents the carrier being raised far enough to smear the underside of the cover when in closed position. Movement of the actuating pin into and out of the offset portions 30 and 31 may be accomplished without effort since the springs 32 and 33 are light enough to offer no substantial resistance, yet strong enough to yieldably retain the pin 15 in its locked position. The finger 29 may limit rotation of tube 12 by engagement with the ends of the recessed portion 26.

What we claim is:

1. A container having an open end portion, a cover for said portion, a carrier for material movable longitudinally within the container, an actuator for the carrier, means for opening and closing the cover on movement of said carrier in opposite directions, said means including a helically slotted tube between the container and carrier, said tube being yieldably held against an abutment limiting longitudinal movement of the tube in one direction.

2. A container having an open end portion, a cover for said portion, a carrier for material movable longitudinally within the container, an actuator for the carrier, means for opening and closing the cover on movement of said carrier in opposite directions, said means including a helically slotted tube between the container and carrier, said tube being yieldably held against an abutment limiting longitudinal movement of the tube in one direction, and a removable cap closing the end portion of the container opposite the cover and engaging a yieldable member which presses said tube against said abutment.

3. A container having an open end portion, a cover for said portion, a carrier for material movable longitudinally within the container, an actuator for the carrier, means for opening and closing the cover on movement of said carrier in opposite directions, said means including a slotted tube between the container and carrier, the open end portion of said container being provided with an inwardly extending projection adapted to engage an end of said tube, the opposite end of said container being closed by a removably secured cap adapted to cooperate with the opposite end of said tube, and said tube being provided with two slots each inclined at least in part, one of the slots receiving said actuator and the other slot receiving an actuating lug on said cover.

4. A container having an open end portion, a cover therefor, a carrier for material movable longitudinally within the container, the end of the container opposite the cover being closed, an actuator for the carrier, a rotatable tube between the container and carrier and cooperating with both the actuator and cover to effect opening and closing movements of the cover in response to movements of the actuator, said tube being substantially longitudinally fixed and provided with a pair of slots, one cooperating with the carrier and one for cooperation with the cover, one of said slots being inclined to the container longitudinal axis throughout the major portion of its length and the other of said slots being so inclined throughout only a small longitudinal distance substantially less than the inclined length of the first of said slots.

5. A container having an open end portion, a cover therefor, a carrier for material movable longitudinally within the container, the end of the container opposite the cover being closed, an actuator for the carrier, a rotatable tube between the container and carrier and cooperating with both the actuator and cover to effect opening and closing movements of the cover in response to movements of the actuator, the cover being provided with arms pivoted to the outside of container and at least one of the arms being provided with a lug bent inwardly from an end thereof and cooperating with said rotatable tube, the cooperation between said lug and tube being such as to effect a swing of the lug and cover arms on rotation of said tube while the same is substantially longitudinally fixed.

6. An automatic container which comprises a casing, a carrier, a cover, a tube provided with helical guide means, a pin projecting from said carrier into cooperation with said guide means, means for effecting relative rotation between said carrier pin and tube, a pin extending through the casing and connecting said cover with said tube for opening and closing the cover in response to rotation of the tube, and means for holding said tube against movement longitudinally of the casing, said cover being constructed to swing clear of and substantially entirely uncover said casing.

7. A holder comprising a casing, a carrier, a cover, a rotatable tube for moving both the cover and carrier, an abutment for limiting longitudinal movement of said tube in one direction, a spring finger cooperating with said tube for holding said tube against said abutment, and a notch in said tube in which said spring finger may be engaged.

8. A holder composing a casing, a carrier, a cover, a rotatable tube for moving both the cover and carrier, an abutment for limiting longitudinal movement of said tube in one direction, a spring finger cooperating with said tube for holding said tube against said abutment, and a notch in said tube in which said spring finger may be engaged, said spring finger engaging one end portion of said tube.

9. A holder comprising a casing, a cover having arms pivoted outside of said casing for swinging the cover clear of the casing, a carrier, an actuator pin connected to said carrier and extending out of a longitudinal slot in the casing, a combined cover opener and shutter within the casing for automatically closing and opening the longitudinal casing slot as the actuator is moved up and down the casing slot, said cover opener and shutter having movement transversely of said casing slot, and guide means to prevent any substantial longitudinal movement of said combined cover opener and shutter.

10. A lipstick holder comprising a casing provided with a longitudinal slot and an open end, an external cover for said open end having arms pivotally connected to said casing, a cover actuating tube rotatably disposed in said casing and having a cam slot therein, the edge of the casing at the open end thereof being turned inwardly for holding the tube against outward movement longitudinally of the casing, means extending through a short slot in the casing and connecting one arm of the cover with the tube for opening and closing the cover in response to rotation of the tube, a carrier slidably disposed within the tube and a pin connected to the carrier and extending through the cam slot of the tube and through the longitudinal casing slot to the outside of the casing.

NATHAN KASDAN.
RICHARD F. LANDWEHR.